United States Patent
Vuppula et al.

(10) Patent No.: US 8,077,720 B2
(45) Date of Patent: Dec. 13, 2011

(54) METHODS AND DEVICES FOR GENERATING AND FORWARDING TRANSLATED MAC ADDRESSES

(75) Inventors: Stevens B. Vuppula, Hudson, NH (US); Haibin Zhou, Boxborough, MA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 156 days.

(21) Appl. No.: 11/711,012

(22) Filed: Feb. 27, 2007

(65) Prior Publication Data

US 2008/0205425 A1  Aug. 28, 2008

(51) Int. Cl.
  *H04L 12/54* (2006.01)
  *H04L 12/56* (2006.01)
  *G06F 15/16* (2006.01)

(52) U.S. Cl. ........ 370/392; 370/400; 370/428; 370/465; 709/238; 709/245; 711/202

(58) Field of Classification Search .................. 370/400, 370/392, 428, 465; 709/238, 245; 711/202
See application file for complete search history.

(56) References Cited

U.S. PATENT DOCUMENTS

| | | | | |
|---|---|---|---|---|
| 5,719,862 A * | 2/1998 | Lee et al. | | 370/355 |
| 5,940,396 A * | 8/1999 | Rochberger | | 370/408 |
| 6,151,324 A * | 11/2000 | Belser et al. | | 370/397 |
| 6,324,178 B1 * | 11/2001 | Lo et al. | | 370/392 |
| 6,553,029 B1 * | 4/2003 | Alexander | | 370/389 |
| 6,717,950 B2 * | 4/2004 | Lui et al. | | 370/408 |
| 6,771,673 B1 * | 8/2004 | Baum et al. | | 370/535 |
| 7,046,669 B1 * | 5/2006 | Mauger et al. | | 370/393 |
| 7,539,198 B1 * | 5/2009 | Truong et al. | | 370/395.1 |
| 7,697,527 B2 * | 4/2010 | Figueira et al. | | 370/392 |
| 7,711,820 B2 * | 5/2010 | Sharma et al. | | 709/226 |
| 2003/0069993 A1 * | 4/2003 | Na et al. | | 709/245 |
| 2004/0141468 A1 * | 7/2004 | Christensen et al. | | 370/252 |
| 2004/0165600 A1 * | 8/2004 | Lee | | 370/395.53 |
| 2006/0184645 A1 * | 8/2006 | Monette et al. | | 709/218 |
| 2006/0280138 A1 * | 12/2006 | Nanda et al. | | 370/315 |
| 2007/0201490 A1 * | 8/2007 | Mahamuni | | 370/395.54 |
| 2007/0288653 A1 * | 12/2007 | Sargor et al. | | 709/245 |
| 2008/0008192 A1 * | 1/2008 | Matoba | | 370/397 |
| 2008/0056300 A1 * | 3/2008 | Williams | | 370/466 |
| 2008/0181243 A1 * | 7/2008 | Vobbilisetty et al. | | 370/406 |
| 2008/0192756 A1 * | 8/2008 | Damola et al. | | 370/400 |
| 2009/0022153 A1 * | 1/2009 | Jain et al. | | 370/389 |
| 2010/0110975 A1 * | 5/2010 | Cagenius | | 370/328 |

FOREIGN PATENT DOCUMENTS

EP  1492268 A1  12/2004
WO  98/36608 A2  8/1998

* cited by examiner

*Primary Examiner* — Alpus H Hsu

(74) *Attorney, Agent, or Firm* — Capitol Patent & Trademark Law Firm, PLLC

(57) ABSTRACT

The number of MAC addresses and corresponding tables that need to be stored to forward messages in a network is substantially reduced. Conventional MAC addresses are converted to translated (sometimes called "virtual") MAC addresses using a new hierarchical format which redefines the conventional 48-bit, MAC label. Though the MAC label is redefined the packet size remains the same. For example, the number of MAC address tables stored by a HUB node may be reduced from 60,000 to 8 while the number stored at a POP node may be reduced from 120,000 to 8 in a "flat" Ethernet design.

8 Claims, 2 Drawing Sheets

METHODS AND DEVICES FOR GENERATING AND FORWARDING TRANSLATED MAC ADDRESSES

BACKGROUND OF THE INVENTION

In conventional data communications networks, devices called "switches" must store every media-access control ("MAC") address of each source/destination in a network. For example, if the switches are central office ("CO") node switches ("nodes" for short) each typically stores 20,000 MAC addresses. Further, associated HUB nodes may each store 60,000 MAC addresses (when 3 COs are aggregated) while associated Point-of Presence ("POP") nodes may each store 120,000 MAC addresses (when 6 COs are aggregated). Thus, in a conventional network a large number of MAC addresses must be stored and maintained. These addresses are stored in so-called MAC address tables. The storage of such a large number of addresses and associated tables, however, has its disadvantages.

First, the storage of a large number of MAC address tables leads to long network convergence times, which in turn places limitations on how fast a network can grow. Second, in the event of a network failure the contents of these large MAC address tables must be "re-learned" causing so-called "broadcast storms". Although, so called "MAC in MAC" techniques may mitigate some of the problems related to the storage of large MAC address tables at HUB nodes, problems still persist when it comes to CO and POP nodes.

In sum, it is desirable to reduce the number of MAC addresses and tables that need to be stored by nodes in a network. It is believed that a reduction will have a significant impact on how large a network can become (i.e., greater scalability) which in turn may directly affect the cost of operating, maintaining and upgrading a network.

SUMMARY OF THE INVENTION

Recognizing this, the inventors discovered novel methods and devices which significantly reduce the number of MAC addresses and corresponding tables that need to be stored at nodes in a network. For example, the number of MAC address tables stored by a HUB node may be reduced from 60,000 to 8 and from 120,000 to 8 at a POP node in a "flat" Ethernet design.

In accordance with one embodiment of the invention, conventional MAC addresses are converted to translated (sometimes called "virtual") MAC addresses using a new hierarchical format which redefines the conventional 48-bit, MAC label. Though the MAC label is redefined the packet size remains the same. For example, one method provided by the present invention includes the steps of: receiving a message containing a conventional MAC address; converting the address into a translated address that includes a value that uniquely identifies a node and an end station identifier value; and forwarding the message containing the converted, translated address on to a next node. Both the unique value and end station identifier value are a part of the new format used to form translated MAC addresses.

The inventors believe that their methods and devices will allow telecom carriers and the like to greatly enlarge the number of nodes in their networks at a relatively low cost.

DETAILED DESCRIPTION OF THE INVENTION, WITH EXAMPLES

Figure 1:
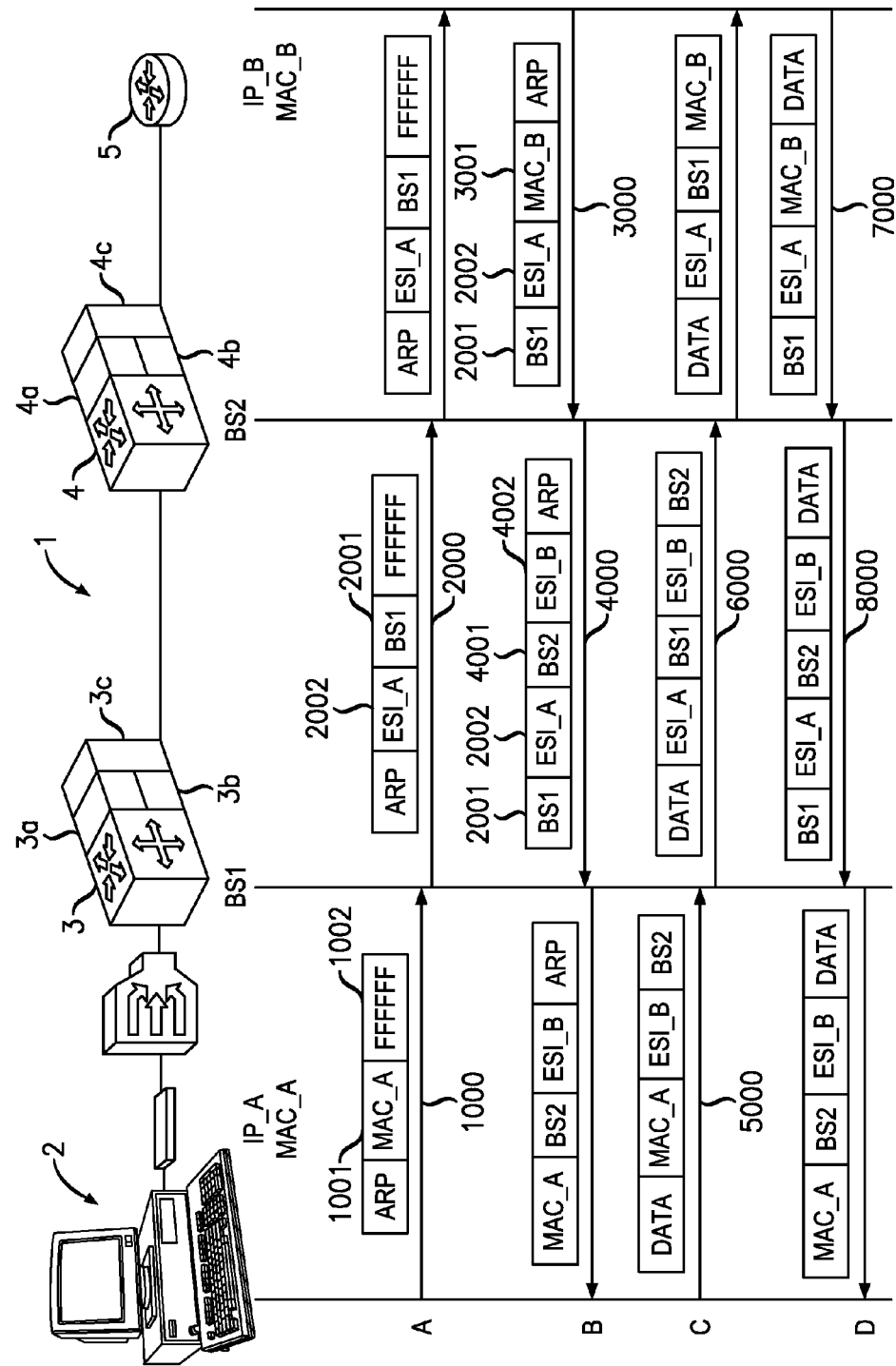
FIG. 1 depicts a simplified diagram of a network containing nodes used to illustrate the conversion of a conventional MAC address into a translated or virtual MAC address according to one embodiment of the present invention.

Referring to FIG. 1, there is depicted a network 1 which includes a source node 2 (e.g. personal computer, client server, etc.), first edge or intermediate node 3 (e.g., backbone switch at a CO or the like), second edge or intermediate node 4 and destination node 5 (e.g., router). When a packet containing a conventional MAC address 1000 is sent from the source node 2 to node 3, a network processor 3a or the like within node 3 controls the conversion of the address into an address 2000 that has a new format in accordance with the present invention. This new format redefines the conventional 48-bit, MAC label. Though the MAC label is redefined the packet size remains the same. This converted MAC address is known as a translated or virtual MAC address (hereafter collectively referred to as a "translated" MAC address).

Figure 2:
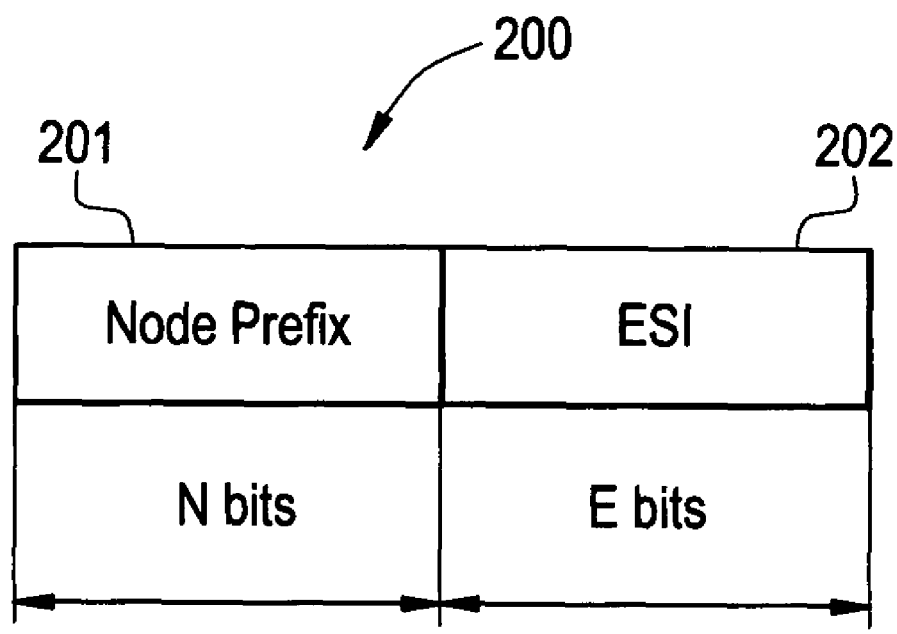
FIG. 2 depicts an example of a translated or virtual MAC address and its component portions according to one embodiment of the invention.

FIG. 2 depicts one example of such a translated MAC address 200. As shown, the address 200 includes a node prefix (NODE PREFIX) portion 201 and an end station identifier (ESI) portion 202. In accordance with the present invention, each network node is assigned a unique NODE PREFIX value.

The NODE PREFIX portion 201 is used to identify the edge node (e.g., node 3) associated with an end station, in this case source node 2. In one embodiment of the invention, the number of bits making up this portion 201 is variable. In a further embodiment of the invention the number of bits varies between one and sixteen. The ESI portion 202 comprises bits that are derived from the original MAC address of an end station. In accordance with one embodiment of the invention the number of bits making up the ESI portion 202 is also variable; for example, from 1 to 48 bits.

Thus, instead of using the conventional MAC address sent by node 2, the edge node 3 generates a translated MAC address similar to that represented by address 200 containing at least portions 201 and 202.

The advantages of using such a translated MAC address can be illustrated by again referring to FIG. 1. Besides the nodes 2-5 mentioned above, FIG. 1 also depicts a number of signaling and data traffic flows A through D. Beginning with flow A, it can be seen that source node 2 sends an Address Resolution Protocol ("ARP") signaling message 1000 to the edge node 3. ARP messages are used to identify the MAC address of a given destination node, in this case destination node 5, when the address is unknown by an originating node (e.g., source node 2). This message 1000 initially contains the conventional MAC address 1001 assigned to source node 2 along with the address "FFFFFF" 1002 which, as is known by those skilled in the art, represents an address that is used to tell the edge node 3 to send the message 1000 to all of the nodes in the network 1.

In accordance with an embodiment of the present invention, upon receiving the message 1000 the edge node 3 converts the message 1000 into a translated message 2000 that consists of a NODE PREFIX portion 2001 which contains the unique value that has been assigned to the edge node 3 and an ESI portion 2002 using processor 3a and tables 3b. In FIG. 1, the nodes 3 and 4 are depicted as backbone switches ("BS"); so the NODE PREFIX portions are similarly labeled "BS".

As stated above, each node, like node 3, is assigned a unique NODE PREFIX value. Further, each node also maintains one or more translation tables 3b or the like. In accordance with an embodiment of the invention, processor 3a is operable to consult or communicate with one or more of the translation tables 3b to translate the conventional MAC address 1001 into an ESI value that forms ESI portion 2002. The combination of the NODE PREFIX value and ESI value may be referred to as the translated MAC address.

The message containing the translated MAC address is then forwarded to the next node 4 in the network by node 3 using a transceiver 3c or the like. Upon receiving the message the next node 4 forwards the message on to the destination address, in this case the addresses indicated by address FFFFFF, using transceiver 4c or the like. In the example shown in FIG. 1, the ultimate destination node is node 5.

Though only two network nodes 3, 4 are shown in FIG. 1 it should be realized that the methods and devices provided by the present invention apply to a network that includes a plurality of nodes.

Once the destination node 5 receives the message it generates a responsive message 3000 (see flow B; message 3000 may be referred to as a next message to distinguish it from message 2000). Recall that in the example shown in FIG. 1 the original message 1000 was an ARP message. Therefore, in response the message 3000 includes its conventional MAC address 3001 (labeled "MAC B") which is forwarded from the node 5 to its edge node, which in flow B is node 4. In accordance with the present invention, the node 4 converts the MAC B address into a translated address using a network processor 4a and translation tables 4b. Similar to the method described above, this translation includes converting the MAC B address into a unique NODE PREFIX value (labeled "BS2" in FIG. 1) that forms portion 4001 and ESI values that form portion 4002. In accordance with an embodiment of the invention, the converted address is made part of a message 4000 that now consists of two translated addresses; one representing the source of message 3000 (i.e., destination node 5) and the other representing the new destination (i.e., address 2000 associated with source node 2). Thereafter, the node 4 is operable to forward the message 4000 on to intermediate node 3 using transceiver 4c or the like using the translated MAC destination address 2000 associated with source node 2. That is, no longer must the node 4 forward the message 4000 by first analyzing a conventional MAC address.

The use of translated MAC addresses provides the following advantages. First, because the number of edge/intermediate/core nodes in a network is far fewer than the number of source/destination/end station nodes, the number of translated MAC addresses (i.e., NODE PREFIXES) and related translation tables 4b node 4 needs to store and consult (using processor 4a or the like) is substantially fewer than the number of conventional MAC address tables that are typically stored. Second, because the number of tables 4b is far fewer, the process of consulting these tables to identify a destination address (using processor 4a and programs designed to carry out "look-up" techniques, for example) in order to determine where to forward a message next is faster. Third, faster look-up processes lead to faster or shorter network convergence times.

In a similar fashion node 3 may forward the message 4000 on to source node 2. It should be understood that each node is capable of converting conventional MAC addresses into translated ones and forwarding messages.

Once the source node 2 has received the message 4000 it may proceed to send and receive data to/from the destination node 5 using similar forwarding methods as illustrated by flows C and D.

It should be understood that while each network node (i.e., edge, core and intermediate nodes) must store a listing of all of the NODE PREFIX values of each network node in network 1, each network node need only store the ESI values of its associated end station(s). Said another way, if a network node is not used as an edge node it will not have to store any ESI values. In practice, there may be many intermediate nodes between nodes 3 and 4 in FIG. 1 which may not operate as edge nodes. If so, these nodes will not have to store any ESI values (and, therefore, no conventional MAC addresses); the result is a substantial reduction in the number of addresses/tables a network node needs to store, maintain and access. For example, the number of MAC address tables stored by a HUB node may be reduced from 60,000 to 8 while those stored by a POP node may be reduced from 120,000 to 8 in a "flat" Ethernet design.

In yet another alternative embodiment of the invention, translation tables may be controlled by a centralized control plane (not shown in FIG. 1).

The centralized control plane may collect topological and quality-of-service ("QoS") information from each node in a network. In addition, the control plane may send commands to nodes (e.g., network processors) instructing them to: build translation table(s); build primary and protection paths (sometimes called "tunnels"); and build static map entries. The centralized control plane may also provide MAC address, translation resolution services. To utilize this capability, a node has to send all of its mapped entries to the control plane and maintain the synchronization required.

For the reader's reference, the methods and devices of the present invention may be a part of products made by Alcatel-Lucent that may be used in backbone networks.

Though the above discussion has set forth some examples of the present invention, the true scope of the present invention is given by the claims that follow.

We claim:

1. A method for generating and forwarding translated media-access control (MAC) addresses comprising:
   receiving a message containing an original MAC address;
   translating the original MAC address to a variable, end station identifier value, that is derived from data bits in the original MAC address, by consulting one or more translation tables to select the variable, end station identifier value from variable, end station identifier values stored in the one or more translation tables;
   converting the original MAC address into a translated address that includes a NODE PREFIX value that uniquely identifies a node and the selected, variable end station identifier value; and
   forwarding the message containing the converted, translated address on to a next node.

2. The method as in claim 1 further comprising:
   receiving a next message containing a converted, translated address; and
   consulting the one or more translation tables to identify a next node to forward the next message on to.

3. The method as in claim 1 wherein the unique value may comprise a NODE PREFIX value that is variable between 1 and 16 bits.

4. The method as in claim 1 wherein the end station identifier value may comprise a value that is variable between 1 and 48 bits.

5. A device for generating and forwarding translated media-access control (MAC) addresses comprising:
- a processor for translating an original MAC address in a received message to a variable, end station identifier value, that is derived from data bits in the original MAC address, by consulting one or more translation tables to select the variable, end station identifier value from variable, end station identifier values stored in the one or more translation tables, and for converting the received message into a translated address that includes a NODE PREFIX value that uniquely identifies a node and the selected, variable end station identifier value; and
- a transceiver for forwarding the message containing the converted, translated address on to a next node.

6. The device as in claim 5 wherein the transceiver further receives a next message containing a converted, translated address, and the processor further consults the one or more translation tables to identify a next node to forward the next message on to.

7. The device as in claim 5 wherein the unique value may comprise a NODE PREFIX value that is variable between 1 and 16 bits.

8. The device as in claim 5 wherein the end station identifier value may comprise a value that is variable between 1 and 48 bits.

* * * * *